June 26, 1973  E. W. BOWMAN  3,741,744
APPARATUS FOR ANNEALING, CONVEYING, TRANSFERRING, AND
SPRAYING GLASSWARE Filed Nov. 24, 1971   5 Sheets-Sheet 1

FIG. I

INVENTOR
EDWARD W BOWMAN

BY *William B Jaspert*
ATTORNEY

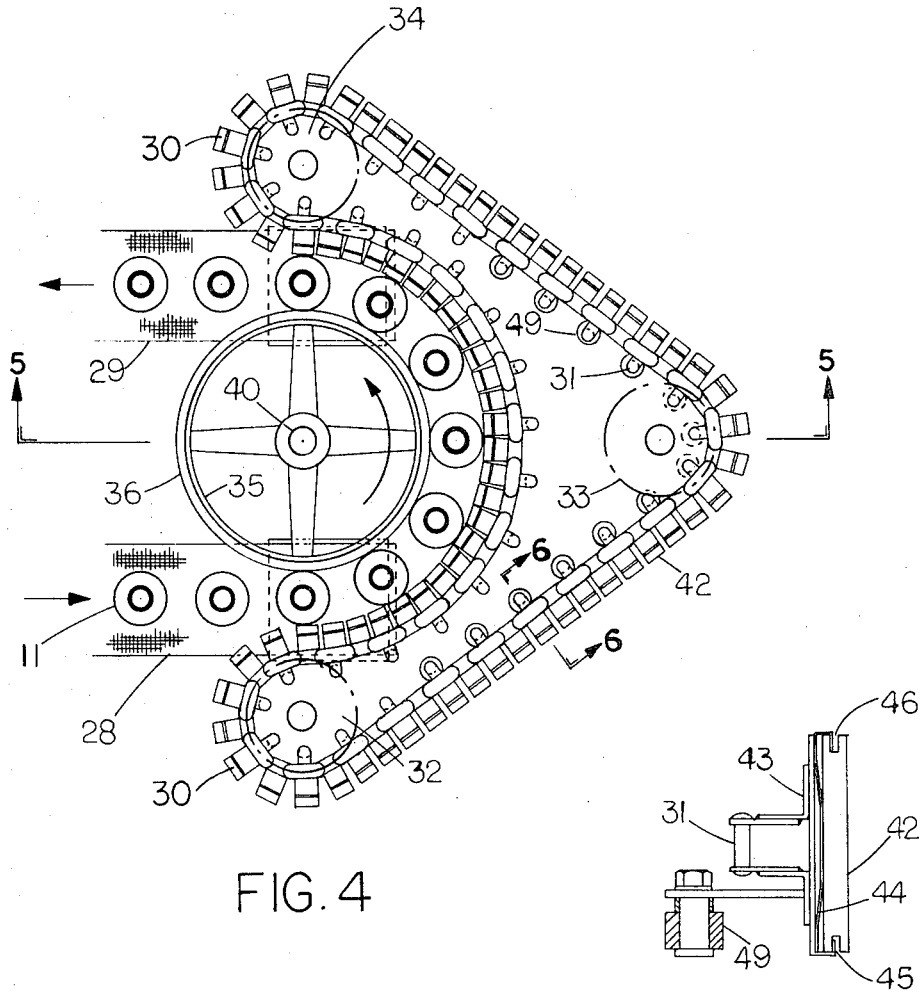
FIG. 4
FIG. 6
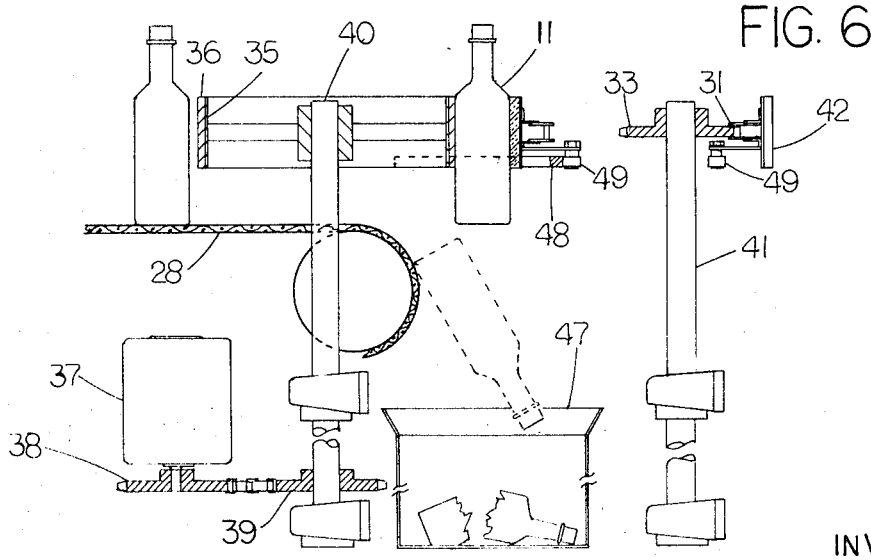
FIG. 5
INVENTOR
EDWARD W BOWMAN
BY William B. Juspert
ATTORNEY

United States Patent Office 3,741,744
Patented June 26, 1973

3,741,744
APPARATUS FOR ANNEALING, CONVEYING, TRANSFERRING, AND SPRAYING GLASSWARE
Edward W. Bowman, Uniontown, Pa., assignor to E. W. Bowman, Incorporated, Uniontown, Pa.
Filed Nov. 24, 1971, Ser. No. 201,890
Int. Cl. C03b 25/04
U.S. Cl. 65—348                                 10 Claims

ABSTRACT OF THE DISCLOSURE

A glass annealing lehr to which newly formed glassware is passed under and over sprays of abrasion resistant material by transfer mechanism that engages the ware and suspends it to expose the bottom to spray, the transfer mechanism in one form being capable of transferring the ware from one conveyor to another moving in opposite directions out of contact with said conveyors during the transfer movement.

BACKGROUND OF THE INVENTION

The invention is in the field of treating glassware to improve its abrasive resistance qualities in handling when washing, bottling, capping, etc. The ware is completely sprayed externally, sides and bottom, with an abrasive resistant solution before it enters and after it leaves the annealing tunnel.

DESCRIPTION OF THE PRIOR ART

Pat. 2,132,138 granted to Williams et al., Oct. 4, 1938, describes in general the treatment of the exterior surfaces of glassware such as bottles, tumblers, and the like to produce thereon a film comprising a lubricant to reduce or eliminate abrasion or frictional contact. It lists the kind of solutions that are very effective as lubricants and the temperature of the ware at which they should be applied.

Numerous patents directed to various compounds in solution and even attempting to monopolize the sprayed glassware as an article of manufacture have been granted after the Williams patent but all of them state the same purpose and list the same result as Williams' for the use of a lubricant to reduce or eliminate abrasion.

SUMMARY OF THE INVENTION

The invention is directed to the means employed for applying the lubricating solution to the ware and not to the lubricant solutions per se. Also, the invention is for apparatus that eliminates abrasive contact of the ware during the spraying and annealing steps.

BRIEF DESCRIPTION OF THE DRAWINGS

FIG. 4, a top plan view of the transfer mechanism of the multiple tunnel lehr of FIG. 3;

FIG. 5, a vertical section partially in elevation of the transfer mechanism of FIG. 4 taken on the line 5—5, FIG. 4;

FIG. 6, a side elevational view partially in section of the gripping jaw mounted on a sprocket chain for engaging the bottles taken on the line 6—6, FIG. 4;

DESCRIPTION OF THE PREFERRED EMBODIMENT

Figure 1:
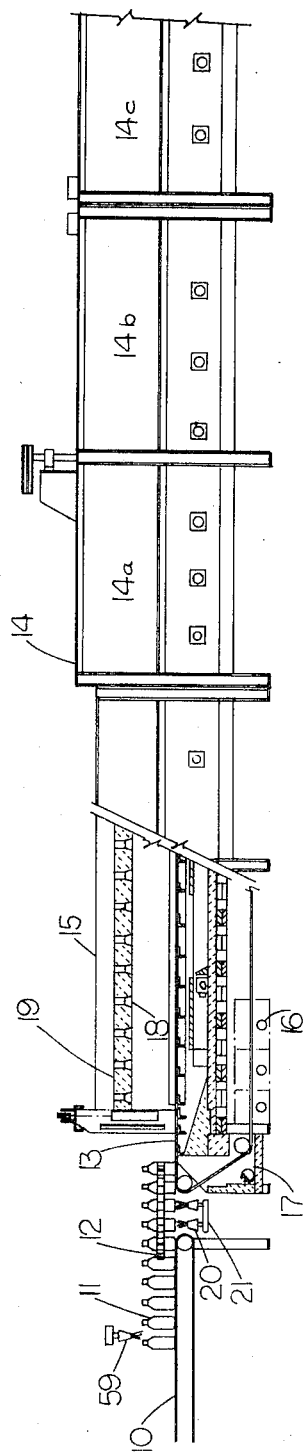
FIG. 1 is a side elevational view partially in vertical section of the charging end of a glass annealing lehr showing ware transfer mechanism for delivering the ware from the forming machine conveyor to the lehr conveyor.
Figure 2:
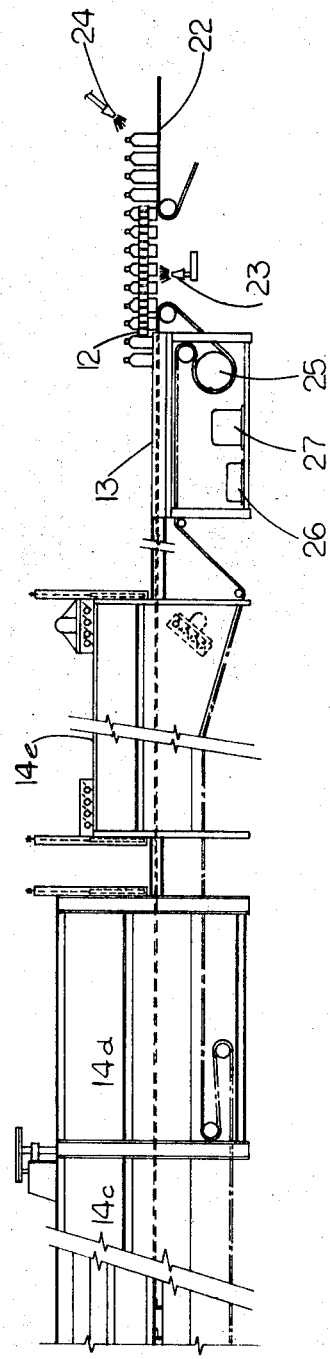
FIG. 2, a side elevation of the discharge end of the lehr of FIG. 1 at and beyond the cooling section showing ware transfer mechanism for delivering the ware to the inspection and packing table.

With reference to the drawings, FIGS. 1 and 2 placed end to end show the charging and discharge end of the lehr. The numeral 10, FIG. 1, designates a conveyor that delivers the bottles, 11, from a ware forming machine (not shown) to a transfer mechanism, 12, of the type shown in FIGS. 7 and 8 by which it is transferred to the conveyor belt, 13, of a glass annealing lehr generally designated by reference character 14. The front or charging end of the lehr, 15, has a series of fire boxes, 16, below the conveyor, 13, and preheating chamber, 17, to preheat conveyor belt, 13. Radiant cup burners, 18, are provided in the roof, 19, of the front heating section to rapidly bring the temperature of the ware to the annealing range and the temperature gradients to which the ware is subjected is controlled by the successive independently controlled temperature zones or sections as described in my Pat. No. 3,601,375 granted Aug. 24, 1971, and Pats. No. 3,010,710 and No. 3,261,596.

As the bottles are transferred from the forming machine conveyor belt, 10, to the annealing lehr conveyor, 13, by transfer mechanism, 12, they are suspended to expose the bottom to lubricating sprays, 20 and 21, to protect them from abrasive contact when engaged by conveyor belt 13.

The treating zones of lehr 14 consists of sections 14a, 14b, 14c, and 14d, as many as are needed for the kind and size of ware to be treated at a given speed of the conveyor 13. The rapid cooling section, 14e, is described in my Pat. No. 3,371,430. As the ware leaves the cooling section, 14e, on conveyor 13, it is again engaged by a straight line transfer mechanism, 12, and is suspended while passing to the packing and inspection conveyor support, 22. A lubricating spray, 23 is then applied as shown in FIG. 2. When the ware is on conveyor 22, a spray, 24, is applied to the sides of the bottles to reduce or eliminate abrasive contact. The conveyor drive drum, 25, is driven by motor 26 through transmission 27. The spraying after annealing is at a lower temperature than spraying at the charging end of the lehr.

Figure 3:
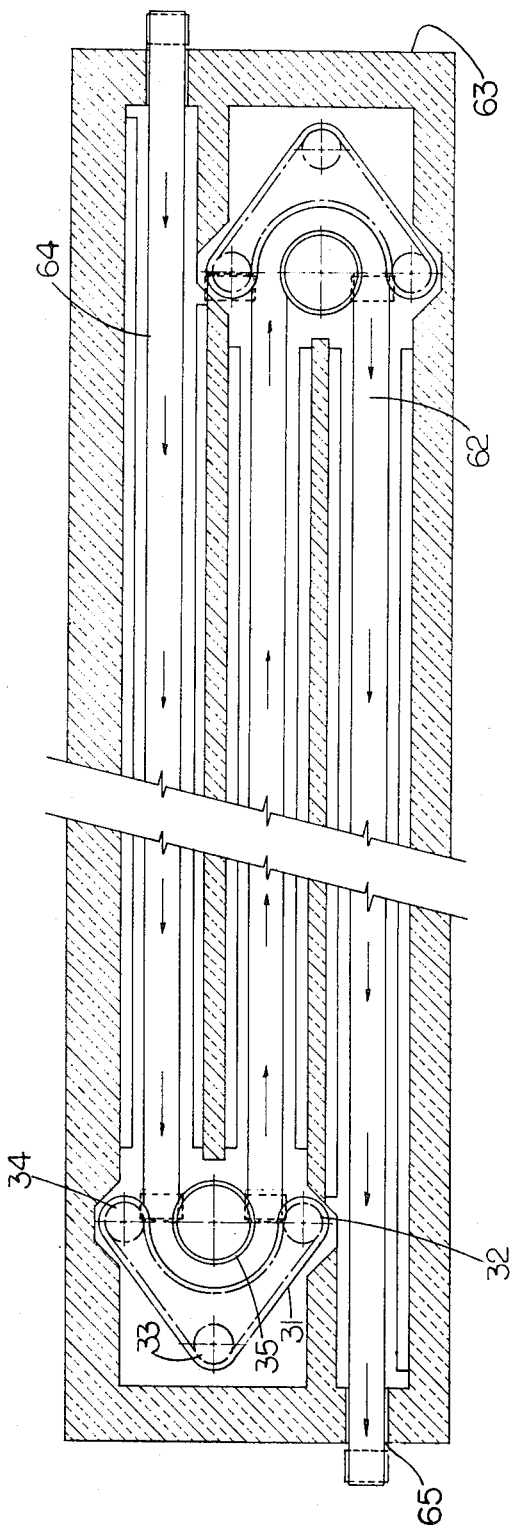
FIG. 3, a longitudinal section of a multiple tunnel lehr with conveyor strands moving in opposite directions and transfer mechanisms for moving the ware from one strand to another, out of contact therewith during the transfer movement.

In reference to the use of the transfer mechanism of FIG. 4, as applied to the multiple tunnel lehr of FIG. 3, the ware, 11, is transferred from conveyor belt 28 to belt 29 by spring mounted pads, 30, assembled on an endless sprocket chain, 31, mounted on sprocket wheels 32, 33, and 34.

A drum, 35, having a resilient surface, 36, for engaging bottles, 11, is driven by motor 37 through sprocket wheels 38 and 39 and spindle 40. The sprocket chain is driven by a motor not shown that drives spindle 41. The speeds of conveyors 28 and 29 and sprocket chain 31 and drum 35 are synchronized to be substantially at the same peripheral speed.

As shown in FIG. 6, gripping pads, 42, are mounted on links, 43, of chain 31 and are supported on spring mounts 44 having flanges 45 engaging grooves 46 to grippingly engage bottles, 11, to suspend them as they pass around drum 35 as shown in FIG. 5. Should any glassware be upset during passage through transfer mechanism of FIG. 4, it will fall off conveyor 28 into a receptacle, 47, as shown in FIG. 5. A circular track, 48, FIG. 5, is engaged by followers, 49, to guide the gripping elements, 42, in spaced relation around drum 35 to hold the ware in suspension as shown in FIG. 5.

Figure 7:
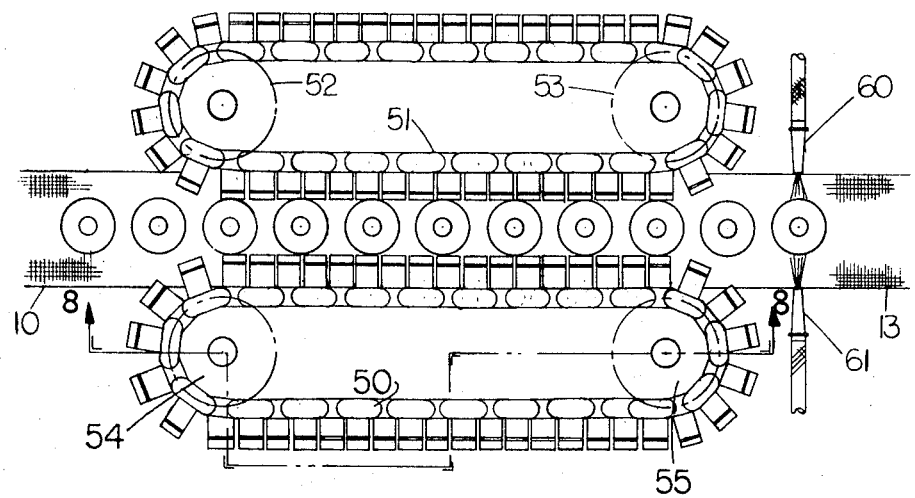
FIG. 7, a top plan view of a straight line transfer mechanism for disengaging the ware from its conveyor support and holding it in suspension for spraying the bottom of the ware.
Figure 8:
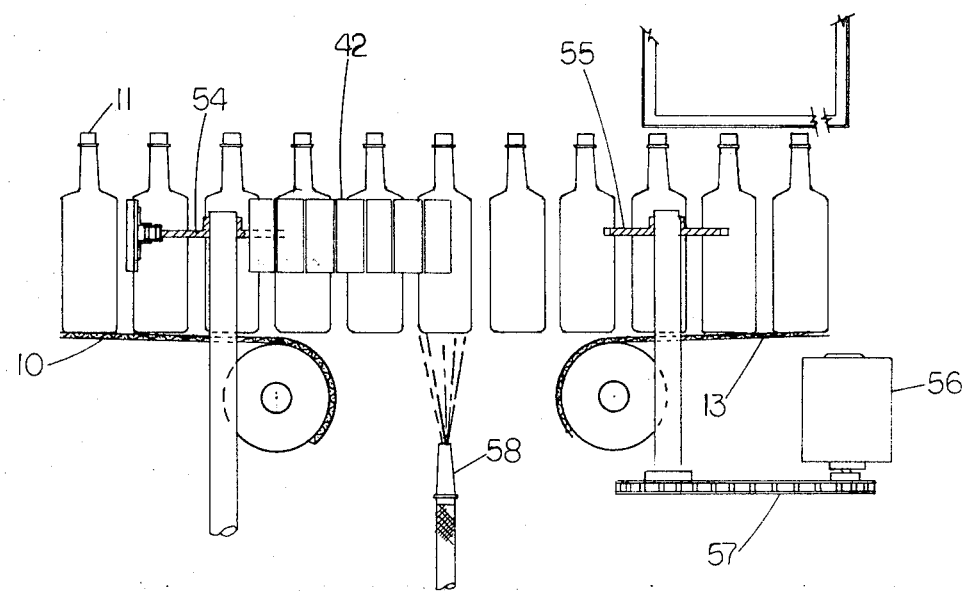
FIG. 8, a side elevation partially in sections taken along the line 8—8, FIG. 7.

In the transfer mechanism of FIGS. 7 and 8, a pair of endless conveyor chains, 50 and 51, are mounted on sprocket wheels, 52, 53, 54, and 55. Wheels 55 and 53 are driven by motors 56 through sprocket chains 57. A single spray nozzle, 58, is shown to spray the bottom of the ware while suspended instead of two in FIG. 1 wherein a single spray nozzle, 59, is shown above the ware to spray the side of the bottles. However, in FIG. 7, two side spray nozzles, 60 and 61, are shown. Unless a long chain of gripping members is required the tension of the gripping chains will maintain alignment of the gripping members for engaging the bottles as shown.

The employment of parallel multiple tunnel lehrs, shown in FIG. 3, has been deferred because of the inability to efficiently transfer the ware from one conveyor to the adjacent conveyor. By means of the transfer mechanisms of FIGS. 4 and 5 which is diagrammatically shown in FIG. 3, the ware is out of abrasive contact when transferred from one to another of the conveyors and the multiple tunnel lehr is now available where space is a factor.

In FIG. 3, the conveyor strand 64 extends outside the lehr housing, 63, for receiving the ware, and conveyor strand 62 extends out of the housing at the exit end 65. The center tunnel is open at both ends to communicate with both transfer mechanism as shown.

It is evident that by means of the herein above described invention utilizing spaced apart conveyor strands with transfer mechanism for bridging and moving the ware from one strand to another and applying non-abrasive sprays to the ware while out of contact with said strands protects it from abrasive contact with the conveying and transfer mechanism and from each other.

Also, the ware may be subject to check detection top and bottom without interrupting the continuity of movement by placing check detector equipment in the path of movement of the ware by the transfer mechanism and the bottles can be rotated when going through the transfer mechanism by simply operating one side of the gripping means at a different speed than the other. The ware could also be labeled without interrupting its movement through the sprays by rotating the ware when one end of the label has been applied.

Although several embodiments of the invention have been herein shown and described it will be evident that various modifications may be made in the details of construction without departing from the principles herein set forth.

I claim:

1. In an industrial heating furnace, a tunnel shaped chamber comprising heating and cooling sections,
   a conveyor for moving the articles to be treated through said tunnel,
   a conveyor for delivering said articles to the charging end of said tunnel,
   said conveyors being spaced apart,
   and transfer mechanism bridging adjacent ends of said conveyors for engaging the articles on the delivery conveyor and transferring them to the tunnel conveyor,
   said transfer mechanism engaging the articles in a manner to expose the bottom of the articles in their travel between adjacent conveyors.

2. In an industrial heating furnace, a tunnel shaped chamber comprising heating and cooling sections,
   a conveyor for moving the articles to be treated through said tunnel,
   a conveyor for delivering said articles to the charging end of said tunnel,
   a conveyor for receiving the articles at the discharge end of said tunnel,
   said conveyors being spaced apart,
   and transfer mechanism bridging adjacent ends of said conveyors for engaging the articles on the delivery conveyor and transferring them to the tunnel conveyor,
   and for engaging the articles on the tunnel conveyor and transferring them to the receiving conveyor,
   said transfer mechanism engaging the articles in a manner to expose the bottom of the articles in their travel between adjacent conveyors.

3. An industrial heating furnace set forth in claim 1 in which,
   the movement of the several conveyors and transfer mechanisms is synchronized to travel at substantially the same speed.

4. An industrial heating furnace set forth in claim 1 in which,
   a spray for coating the sides of the article is provided in the path of movement of the articles on the delivery conveyor.

5. An industrial heating furnace as set forth in claim 1 further including a spray for coating the sides of the article, said spray being in the path of movement of the article on the receiving conveyor.

6. An industrial heating furnace as set forth in claim 1 further including a spray for coating the bottom of the articles, said spray being in the path of movement of the article through and by the transfer mechanism.

7. In a glass annealing lehr;
   the combination with an endless conveyor moving through the lehr tunnel having
   conveyor means for delivering ware to said endless conveyor at the charging end of the tunnel,
   and for receiving said ware from said conveyor at the discharge end of said tunnel,
   said conveyor means being spaced apart and synchonized to move at substantially the same speed;
   of transfer mechanism bridging the space between the conveyor means comprising,
   a gripping mechanism of articulate clamping members for engaging one side of the ware mounted on an endless chain having sprocket wheels at opposite ends of the space between said conveying means,
   said clamping members being connected to the chain by spring means to grippingly engage the ware to suspend it out of bottom contact with said conveyor means during the ware transfer movement.

8. The combination of conveyor and transfer mechanism set forth in claim 7 in which,
   the endless tracks of clamping members are juxtaposed to form an uninterrupted path of travel of the ware in alignment with the conveyor means.

9. The combination of conveyor and transfer mechanism as set forth in claim 7 in which,
   the lehr has multiple tunnels with conveyor strands passing therethrough,
and the transfer mechanism comprising a chain of gripping members mounted on triangularly spaced sprockets wheels to form,
an angular path around a drum mounted between the ends of adjacent tunnels.

10. The combination set forth in claim 9 in which,
the chain of clamping members is provided with followers and,
a spaced cam track is provided around the drum to maintain a path of travel of the suspended ware out of contact with the conveyors.

References Cited
UNITED STATES PATENTS

| | | | |
|---|---|---|---|
| 1,745,362 | 2/1930 | Evans | 65—348 X |
| 2,244,772 | 6/1941 | Geer | 65—349 |
| 2,253,155 | 8/1941 | Wadman et al. | 65—348 |
| 3,303,918 | 2/1967 | Larson | 198—103 |

ARTHUR D. KELLOGG, Primary Examiner

U.S. Cl. X.R.

65—60, 118; 118—324; 198—95, 103